(12) United States Patent
Kurokawa et al.

(10) Patent No.: US 9,144,850 B2
(45) Date of Patent: Sep. 29, 2015

(54) CUTTING INSERT AND INDEXABLE ENDMILL

(71) Applicants: Masahiro Kurokawa, Iwaki (JP); Kedar Suresh Bhagath, Iwaki (JP)

(72) Inventors: Masahiro Kurokawa, Iwaki (JP); Kedar Suresh Bhagath, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 211 days.

(21) Appl. No.: 13/739,848

(22) Filed: Jan. 11, 2013

(65) Prior Publication Data
US 2013/0136547 A1    May 30, 2013

Related U.S. Application Data

(63) Continuation-in-part of application No. PCT/JP2012/052455, filed on Feb. 3, 2012.

(30) Foreign Application Priority Data

Feb. 24, 2011    (JP) .................................. 2011-037741

(51) Int. Cl.
*B23C 5/20* (2006.01)
*B23C 5/16* (2006.01)
*B23C 5/10* (2006.01)

(52) U.S. Cl.
CPC ............. *B23C 5/207* (2013.01); *B23C 5/109* (2013.01); *B23C 2200/0416* (2013.01); *B23C 2200/085* (2013.01); *B23C 2200/203* (2013.01); *B23C 2200/205* (2013.01); *Y10T 407/1924* (2015.01); *Y10T 407/23* (2015.01)

(58) Field of Classification Search
USPC .................................. 407/34, 35, 40, 42, 113
See application file for complete search history.

(56) References Cited

U.S. PATENT DOCUMENTS 3,226,797 A * 1/1966 Hertel ........................... 407/101
3,541,655 A * 11/1970 Stier ............................. 407/113
4,090,801 A * 5/1978 Faber ........................... 407/113

(Continued)

FOREIGN PATENT DOCUMENTS

DE    10336616 A1 * 5/2004
JP    H10-291115    4/1998

(Continued)

OTHER PUBLICATIONS

International Search Report dated Feb. 28, 2012 issued in PCT counterpart application (No. PCT/JP2012/052455).

(Continued)

*Primary Examiner* — Sunil K Singh
*Assistant Examiner* — Sara Addisu
(74) *Attorney, Agent, or Firm* — Womble Carlyle

(57) ABSTRACT

A cutting insert for a multifunctional endmill is capable of using three corners. The cutting insert includes a top surface and a bottom surface having an outer shape of a substantially polygonal shape and four side surfaces extending between the top surface and the bottom surface, a first side surface has a positive flank angle, a second side surface has a positive flank angle, a third side surface has the positive flank angle, the first side surface includes a first and a second component surfaces connected with each other so that the first side surface protrudes outward from a peripheral surface of the cutting insert, and a connection portion between a first and a second component surface extends between the top surface and the bottom surface.

20 Claims, 9 Drawing Sheets

(56) References Cited

U.S. PATENT DOCUMENTS

| | | | |
|---|---|---|---|
| 4,648,760 A * | 3/1987 | Karlsson et al. | 408/223 |
| 4,681,488 A * | 7/1987 | Markusson | 407/114 |
| 4,712,949 A * | 12/1987 | Johnson | 407/42 |
| 4,954,021 A * | 9/1990 | Tsujimura et al. | 407/35 |
| 5,049,011 A * | 9/1991 | Bohnet et al. | 408/223 |
| 5,244,318 A * | 9/1993 | Arai et al. | 407/42 |
| 5,314,269 A * | 5/1994 | Arai et al. | 407/42 |
| 5,443,335 A * | 8/1995 | Shimano et al. | 407/113 |
| 5,800,100 A | 9/1998 | Krenzer | |
| 5,971,676 A * | 10/1999 | Kojima | 408/231 |
| 6,257,807 B1 * | 7/2001 | Heinloth | 407/113 |
| 6,413,023 B1 * | 7/2002 | Nagashima | 408/223 |
| 6,939,090 B1 * | 9/2005 | Nagaya et al. | 407/54 |
| 6,939,091 B2 * | 9/2005 | Wermeister | 407/113 |
| 7,168,512 B2 * | 1/2007 | Schuffenhauer et al. | 175/426 |
| 7,572,086 B2 * | 8/2009 | Nagaya et al. | 407/113 |
| 7,572,087 B2 * | 8/2009 | Nagaya et al. | 407/113 |
| 8,480,337 B2 * | 7/2013 | Bae | 408/223 |
| 8,545,136 B2 * | 10/2013 | Konta | 407/114 |
| 8,651,778 B2 * | 2/2014 | Okumura | 408/223 |
| 8,827,605 B2 * | 9/2014 | Mergenthaler et al. | 408/223 |
| 2003/0223833 A1 * | 12/2003 | Roman | 408/224 |
| 2005/0111928 A1 * | 5/2005 | Stanarius et al. | 409/132 |
| 2008/0181737 A1 * | 7/2008 | Limell et al. | 408/188 |
| 2010/0111627 A1 * | 5/2010 | Bae | 408/200 |
| 2010/0119313 A1 * | 5/2010 | Hartlohner et al. | 407/103 |
| 2010/0166514 A1 | 7/2010 | Okumura | |
| 2011/0164936 A1 * | 7/2011 | Okumura | 408/1 BD |
| 2011/0274506 A1 * | 11/2011 | Kakai | 407/40 |
| 2012/0087748 A1 * | 4/2012 | Uno et al. | 407/42 |
| 2013/0129434 A1 * | 5/2013 | Bhagath | 407/51 |

FOREIGN PATENT DOCUMENTS

| | | |
|---|---|---|
| JP | H11-254207 | 9/1999 |
| JP | 2004-160606 A | 6/2004 |
| JP | 2008-279519 A | 11/2008 |

OTHER PUBLICATIONS

International Preliminary Report on Patentability (IPRP) dated Aug. 27, 2013 issued in PCT counterpart application (No. PCT/JP2012/052455) with English Translation.

* cited by examiner

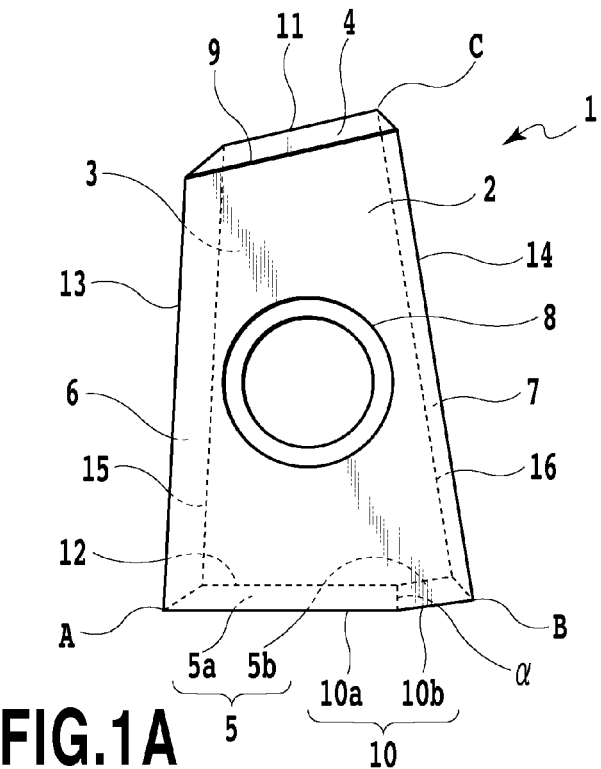
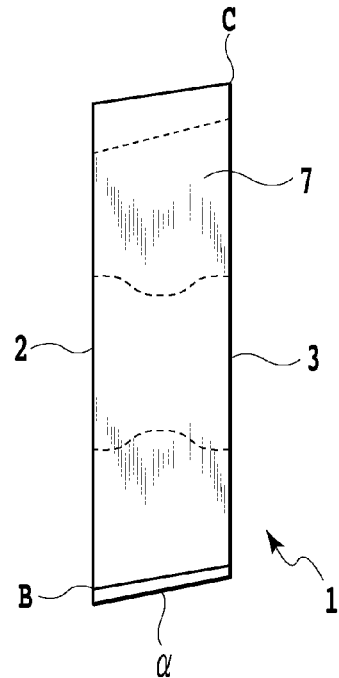
FIG.1A  FIG.1C
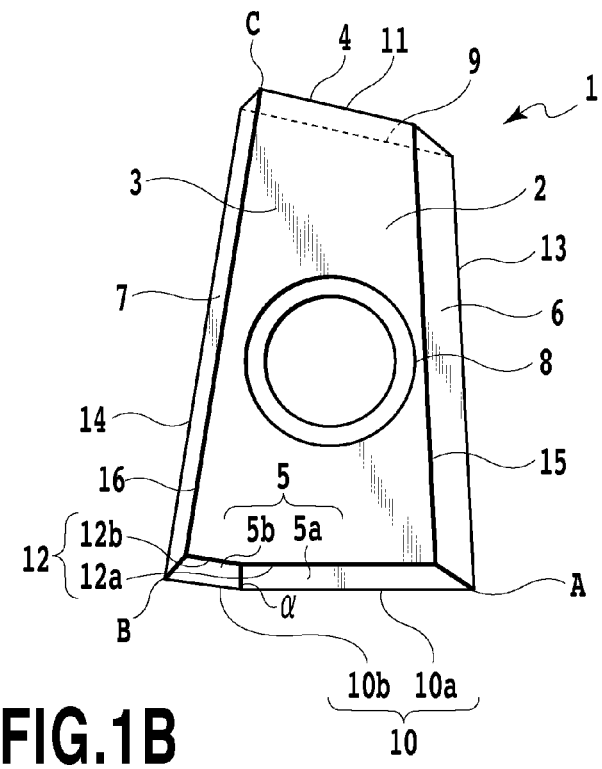
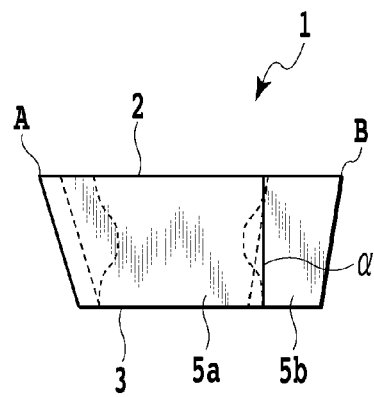
FIG.1B  FIG.1D

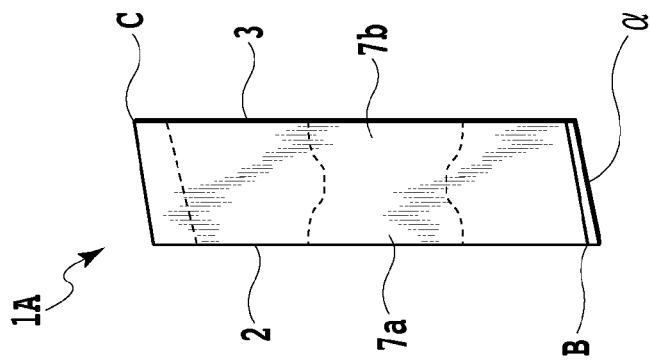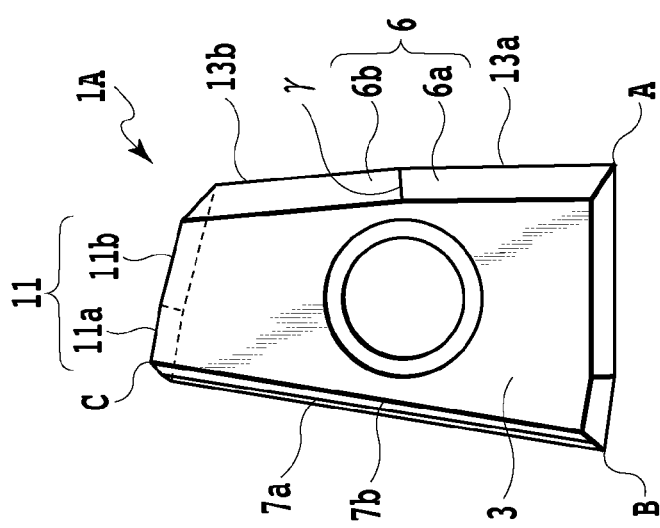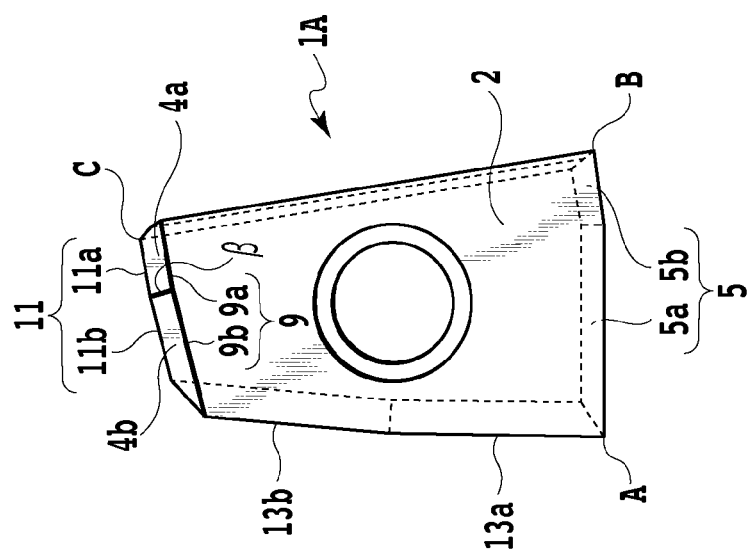

CUTTING INSERT AND INDEXABLE ENDMILL

CROSS-REFERENCE TO RELATED APPLICATIONS

This is a continuation-in-part of PCT application No. PCT/JP2012/052455, filed Feb. 3, 2012, which claims the benefit of Japanese Patent Application 2011-037741, filed Feb. 24, 2011 . The contents of the aforementioned applications are hereby incorporated by reference in their entirety.

BACKGROUND OF THE INVENTION

1. Field of the Invention

The present invention relates to a cutting insert and an indexable endmill. More specifically, the present invention relates to a cutting insert that can be replaceably attached to a multifunctional endmill capable of drilling and an indexable endmill to which the cutting insert is attached.

2. Description of the Related Art

A number of prior-art multifunctional endmills capable of drilling have been designed. The multifunctional endmill generally includes two cutting inserts attached at a tip end of a cylindrical tool body, and is an endmill capable of performing a cutting work in both of an XY direction (lateral direction) and a Z direction (depth direction) with respect to a work material. The cutting insert attached to such a multifunctional endmill includes a peripheral cutting edge for performing cutting in the lateral direction and a face cutting edge (bottom cutting edge) for performing cutting in the depth direction.

As a cutting insert attached to the multifunctional endmill, for example, the invention disclosed in Japanese Patent Laid-Open No. H10-291115(1998) is known. The multifunctional endmill described in the Japanese Patent Laid-Open No. H10-291115(1998) is of a two-cutting-edge type, which uses two cutting inserts (first cutting insert and second cutting insert). The first cutting insert and the second cutting insert are different from each other, and each of them includes the face cutting edge and the peripheral cutting edge. The cutting work is performed by the multifunctional endmill to which the two types of such cutting inserts are attached.

In addition, as a cutting insert attached to the multifunctional endmill, the invention disclosed in Japanese Patent Laid-Open No. H11-254207(1999) is known. The multifunctional endmill described in the Japanese Patent Laid-Open No. H11-254207(1999) is of a two-cutting-edge type, which uses two cutting inserts (first cutting insert and second cutting insert). The first cutting insert and the second cutting insert are of the same type, and two of the face cutting edge and the peripheral cutting edge are paired, and two pairs of them are provided on a top surface of the cutting insert. In other words, two corners on a diagonal line can be used on the top surface of the cutting insert. On two cutting insert seat surfaces of the endmill, the cutting inserts of the same type are disposed so that different corners are used as the cutting edges involved in cutting.

As described above, according to the invention of the Japanese Patent Laid-Open No. H11-254207(1999), two cutting inserts of the same type to be attached to the endmill of a two-cutting-edge type can be used so that, when the cutting edge is abraded or damaged, the two cutting inserts can be exchanged to use another pair of cutting edges. As described above, since the cutting insert of the same type can be used in turn, manufacturing costs of the cutting inserts can be reduced, and further tool management can be facilitated.

SUMMARY OF THE INVENTION

Incidentally, also in the multifunctional endmill capable of drilling, as in the general endmill, further improvement of machining efficiency is demanded. As one method of realizing high-efficiency machining, there is a method of increasing the number of the cutting inserts attached to the endmill to increase the number of the cutting edges involved in cutting. More specifically, by changing the endmill of the two-cutting-edge type to that of a three-cutting-edge type, the highly-efficient machining can be realized.

However, according to the invention disclosed in the Japanese Patent Laid-Open No. H10-291115(1998), since the cutting inserts of the different types are used for each of the two cutting edges, if they are adopted to the endmill of the three-cutting-edge type as it is, three types of cutting inserts are required. Therefore, the manufacturing cost of the cutting inserts and the tool management become a big burden.

Further, the cutting insert disclosed in the Japanese Patent Laid-Open No. H11-254207(1999) is optimized for the multifunctional endmill of a two-cutting-edge type, and thus only two corners of the top surface can be used. Therefore, for the purpose of high-feed machining, when the number of the cutting inserts of the multifunctional endmill is increased by one to form three cutting edges, a cutting insert of a different type needs to be introduced as a third cutting insert. As another method, the cutting insert that is described in the Japanese Patent Laid-Open No. H11-254207(1999) and capable of using the two corners can be used as the third cutting insert, but, when three cutting inserts are exchanged among three seat portions, one corner of any one of the cutting inserts cannot be used, which is wasteful and uneconomical. To not waste the corner, a plurality of types of cutting inserts needs to be used. As described above, also in the cutting insert described in the Japanese Patent Laid-Open No. H11-254207 (1999), the multifunctional endmill of a three-cutting-edge type has problems of the costs and the tool management.

The present invention is made in view of the above-described problems, and has an object to provide the cutting insert for the multifunctional endmill capable of using three corners and an indexable endmill of a three-cutting-edge type to which the cutting insert is attached.

A cutting insert of the present invention has a plate-like shape and includes:

a top surface and a bottom surface having an outer shape in a substantially polygonal shape;

at least four side surfaces extending between the top surface and the bottom surface; and a mounting hole passing through the top surface and the bottom surface, wherein, of at least four sides of the top surface corresponding to the at least four side surfaces, two short sides are formed to be non-parallel to each other and different in length from each other, and two long sides are formed to be non-parallel to each other and different in length from each other;

wherein, of the at least four side surfaces, the side surface located on a side of a first short side of the two short sides comprises a positive flank angle from the bottom surface toward the top surface;

wherein, of the four side surfaces, the side surface located on a side of a second short side of the two short sides comprises a positive flank angle from the top surface toward the bottom surface;

wherein, of the four side surfaces, the side surface located on a side of a first long side of the two long sides comprises a positive flank angle from the top surface toward the bottom surface; and wherein the side surface located on the side of the second short side includes a first and a second surface connected with each other such that the side surface protrudes outward from a peripheral surface of the cutting insert, and a connection portion between the first and second surfaces extends between the top surface and the bottom surface.

An endmill of the present invention includes a cylindrical tool body; three seat portions provided at a tip end portion of the tool body; and three cutting inserts described above, attached to the three seat portions, respectively, wherein, of the three cutting inserts, a first cutting insert is disposed such that a first corner (A) involved in cutting is positioned on a tip end side and on a peripheral surface side of the tool body, a second cutting insert is disposed such that a second corner (B) involved in cutting is positioned on a tip end side and on a peripheral surface side of the tool body, and a third cutting insert is disposed such that a third corner (C) involved in cutting is positioned on a tip end side and on a peripheral surface side of the tool body; and wherein the three cutting inserts are disposed such that each face cutting edge protrudes forward from the tip end surface of the tool body and a peripheral cutting edge protrudes outward from the peripheral surface of the tool body.

According to the present invention, since the peripheral cutting edge includes three effective cutting edges, when a feed rate per one cutting edge is set equivalent to that of the cutting edge of the two-cutting-edge type, a feed rate per one rotation of the tool is increased by 1.5 times, thereby enabling to perform the cutting work more efficiently. Since the number of the corners which the cutting insert can use is three, even if disposing positions of the cutting inserts are exchanged in the multifunctional endmill of a three-cutting-edge type, any corner is not wasted, which is economical. Since the multifunctional endmill of a three-cutting-edge type can be obtained with the cutting inserts of a single type, the tool management can be facilitated.

Further features of the present invention will become apparent from the following description of exemplary embodiments (with reference to the attached drawings).

BRIEF DESCRIPTION OF THE DRAWINGS

FIG. 1A is a top surface view of an exemplary embodiment of a cutting insert of the present invention;

FIG. 1B is a bottom surface view of the exemplary embodiment of the cutting insert illustrated in FIG. 1A;

FIG. 1C is a side surface view of the exemplary embodiment of the cutting insert illustrated in FIG. 1A;

FIG. 1D is a side surface view of the exemplary embodiment of the cutting insert illustrated in FIG. 1A;

FIG. 2A is a top surface view of a modification example of the cutting insert illustrated in FIGS. 1A to 1D;

FIG. 2B is a bottom surface view of a modification example of the cutting insert illustrated in FIGS. 1A to 1D;

FIG. 2C is a side surface view of a modification example of the cutting insert illustrated in FIGS. 1A to 1D;

DETAILED DESCRIPTION

Figure 3A:
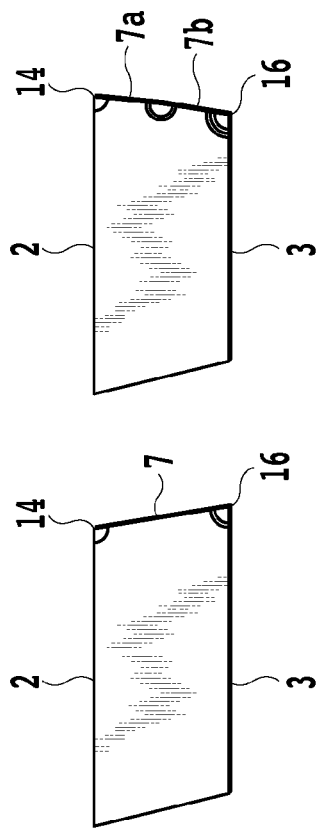
FIG. 3A is a side surface view of further another modification example of the cutting insert illustrated in FIGS. 1A to 1D.

With reference to figures, exemplary embodiments of the present invention will be described in detail hereinbelow.

FIGS. 1A to 1D illustrate a top surface view, a bottom surface view, and a side surface view according to an exemplary embodiment of a cutting insert of the present invention. A cutting insert 1 according to the present exemplary embodiment is formed of a member in a plate-like shape and includes a top surface 2 and a bottom surface 3 facing in opposite directions. The top surface 2 and the bottom surface 3 have an outer shape of a substantially pentagonal shape. Between the top surface 2 and the bottom surface 3 extend a plurality of side surfaces 4, 5, 6 and 7, side surface 5 comprising a plurality of component surfaces 5a, 5b, as described below. For present purposes, the side surfaces 4, 5 6 and 7 will be considered as first side surface 4, second side surface 5, third side surface 6 and fourth side surface 7. At least a part of a plurality of intersection portions where the top surface 2 and each of the side surfaces 4, 5, 6, and 7 intersect each other and a plurality of intersection portions where the bottom surface 3 and each of the side surfaces 4, 5, 6, and 7 intersect each other functions as a cutting edge. Those cutting edges will be described in detail below.

An outer shape of the top surface 2 includes two upper short sides 9 and 10 that are relatively short, and two upper long sides 13 and 14 that are relatively long. The upper short sides 9 and 10 have a non-parallel relationship, and one upper short side (upper first short side) 9 is shorter than the other upper short side (upper second short side) 10. The upper long sides 13 and 14 have a non-parallel relationship, and one upper long side (upper first long side) 13 is shorter than the other upper long side (upper second long side) 14.

An outer shape of the bottom surface 3 includes two lower short sides 11 and 12 that are relatively short, and two lower long sides 15 and 16 that are relatively long. The lower short sides 11 and 12 have the non-parallel relationship, and one lower short side (lower first short side) 11 is shorter than the other lower short side (lower second short side) 12. The lower long sides 15 and 16 have the non-parallel relationship, and one lower long side (lower first long side) 15 is shorter than the other lower long side (lower second long side) 16.

The above described side surfaces 4, 5, 6, and 7 extend between the upper first short side 9 and the lower first short side 11, between the upper second short side 10 and the lower second short side 12, between the upper first long side 13 and the lower first long side 15, and between the upper second long side 14 and the lower second long side 16, respectively.

Further, as a characteristic shape according to the present exemplary embodiment, the second side surface 5 of the cutting insert 1 is not configured by a common flat surface, but configured by two separate first and second component surfaces 5a and 5b connected with each other. A connection portion α between two of the first and second component surfaces 5a and 5b on the side surface 5 extends between the top surface 2 and the bottom surface 3, and is between an upper corners A and B, and preferably closer to upper corner B than to upper corner A. The upper second short side 10 of the top surface 2 is also divided into a long portion 10a and a short portion 10b by the connection portion α. Further, similarly, the lower second short side 12 of the bottom surface 3 is also divided into a portion 12a and a portion 12b. The side surface 5 may be clearly divided into two flat surfaces at the connection portion α, or the first component surface 5a and the second component surface 5b may be smoothly connected in a curved surface near the connection portion α. As a result, in the cutting insert 1 according to the present exemplary embodiment, since the second side surface 5 includes the two component surfaces 5a and 5b connected with each other so that the second side surface 5 protrudes outward, the outer shapes of the top surface 2 and the bottom surface 2 have the substantially pentagonal shape.

On the top surface 2 of the cutting insert 1, a corner connected with the long portion 10a is defined as the upper first corner A and a corner connected with the short portion 10b is defined as the upper second corner B. The upper corners A and B are the corners involved in cutting. Further, on the bottom surface 3 of the cutting insert 1, a lower corner, which is an intersection portion between the lower first short side 11 and the lower second long side 16, is defined as a lower third corner C. The lower third corner C is also a corner involved in cutting. As described above, the cutting insert 1 according to the present exemplary embodiment includes the two upper corners A and B on the top surface 2. Further, the cutting insert 1 includes a single lower third corner C on the bottom surface 3. In other words, the cutting insert 1 includes three corners A, B, and C in total involved in cutting. According to the present exemplary embodiment, tool angles of the corners A, B, and C are set to 89°, respectively, but are not limited thereto, and the angles may be 90° or less. Furthermore, a shape of the corner may be formed sharply, or may be formed in a rounded shape.

Of the sides connected to the upper first corner A, the long portion 10a serves as a peripheral cutting edge (main cutting edge), and the upper first long side 13 serves as a face cutting edge (sub cutting edge). Of the sides connected to the upper second corner B, the upper second long side 14 functions as the peripheral cutting edge (main cutting edge), and the short portion 10b functions as the face cutting edge (sub cutting edge). Of the sides connected to the lower third corner C, the lower second long side 16 functions as the peripheral cutting edge (main cutting edge), and the lower first short side 11 functions as the face cutting edge (sub cutting edge). Herein, the peripheral cutting edge indicates the cutting edge performing cutting when the endmill is fed in the XY direction (lateral direction) with respect to the work material, and the face cutting edge indicates the cutting edge performing cutting when the endmill is fed in the Z direction (depth direction) with respect to the work material.

Therefore, when the upper first corner A is involved in cutting, the top surface 2 of the cutting insert 1 becomes a rake surface, the third side surface 6 serves as a flank of the face cutting edge 13, and the first component surface 5a serves as the flank of the peripheral cutting edge 10a. When the upper second corner B is involved in cutting, the top surface 2 of the cutting insert 1 serves as the rake surface, the second component surface 5b serves as a flank of the face cutting edge 10b, and the fourth side surface 7 serves as the flank of the peripheral cutting edge 14. When the lower third corner C is involved in cutting, the bottom surface 3 of the cutting insert 1 serves as the rake surface, the first side surface 4 serves as the flank of the face cutting edge 11, and the fourth side surface 7 serves as the flank of the peripheral cutting edge 16.

Further, in the cutting insert 1 according to the present exemplary embodiment, as particularly illustrated in FIGS. 1C and 1D, a positive flank angle is provided to the cutting edges 10a and 10b between the upper first corner A and the upper second corner B from the top surface 2 toward the bottom surface 3, and a positive flank angle is provided to the cutting edge 11 connected to the lower third corner C from the bottom surface 3 toward the top surface 2. Furthermore, a positive flank angle is provided to the cutting edge 13, which is the first long side on the top surface 2, from the top surface 2 toward the bottom surface 3. In other words, on the flanks (side surfaces 6, 5, and 4) of the face cutting edges of the three corners A, B, and C involved in cutting are formed to have the positive flank angles, respectively.

As illustrated in FIGS. 2A to 2C, the first side surface 4 on a side of the first short side of a cutting insert 1A may not be configured by the common flat surface but may be configured by two separate component surfaces 4a and 4b connected with each other in a similar manner to the second side surface 5. In such a case, at the lower short side 11 of the bottom surface 3, a portion from the lower third corner C to a connection portion β is defined as a cutting edge 11a, and a portion from the connection portion β to an end portion on a side of the first long side is defined as a cutting edge 11b. Similarly, the third side surface 6 on the side of the first long side of the cutting insert 1A may not be configured by the common flat surface either, but may be configured by two separate component surfaces 6a and 6b connected with each other. In such a case, in the upper first long side 13 of the top surface 2, a portion from the corner A to the connection portion γ is defined as a cutting edge 13a, and a portion from the connection portion γ to an end portion of the upper first short side 9 is defined as a cutting edge 13b. The component surfaces 4a and 4b, and the component surfaces 6a and 6b may be clearly divided at the connection portions β and γ, or may be smoothly connected by a curved surface near each of the connection portions β and γ.

Figure 3B:
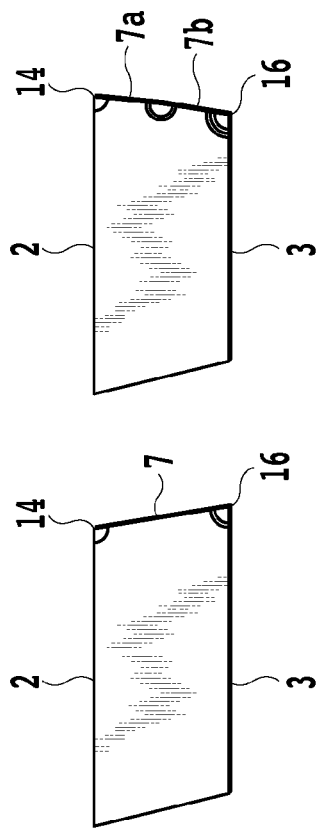
FIG. 3B is a side surface view of further another modification example of the cutting insert illustrated in FIGS. 1A to 1D.
Figure 3C:
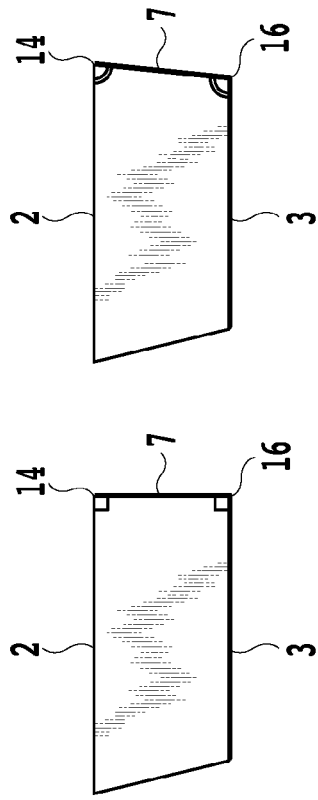
FIG. 3C is a side surface view of further another modification example of the cutting insert illustrated in FIGS. 1A to 1D.

FIGS. 3A to 3G are the side surface views of further another modification example of the cutting insert illustrated in FIGS. 1A to 1D. On the fourth side surface 7 on a side of the upper and lower second long sides 14, 16, respectively, as illustrated in FIG. 3B, a positive flank angle may be provided from the top surface 2 toward the bottom surface 3, or as illustrated in FIG. 3C, a negative flank angle may be provided.

Figure 3D:
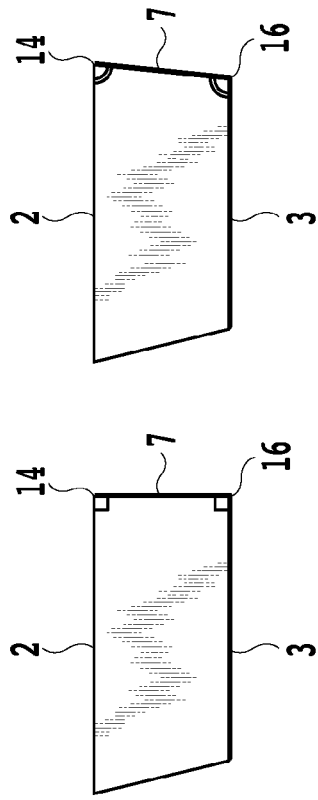
FIG. 3D is a side surface view of further another modification example of the cutting insert illustrated in FIGS. 1A to 1D.
Figure 3E:
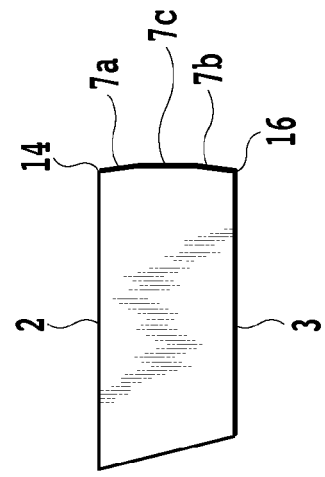
FIG. 3E is a side surface view of further another modification example of the cutting insert illustrated in FIGS. 1A to 1D.
Figure 3F:
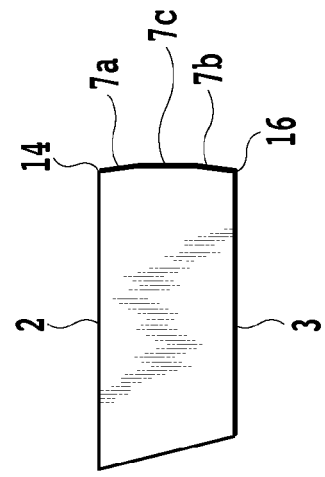
FIG. 3F is a side surface view of further another modification example of the cutting insert illustrated in FIGS. 1A to 1D.
Figure 3G:
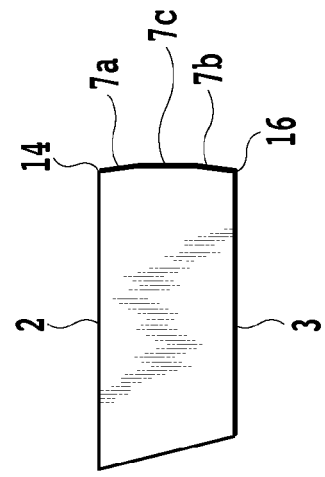
FIG. 3G is a side surface view of further another modification example of the cutting insert illustrated in FIGS. 1A to 1D.

Further, as illustrated in FIG. 3A, the fourth side surface 7 may orthogonally intersect the top surface 2 and the bottom surface 3. Furthermore, the fourth side surface 7 may not be configured by one surface, but as illustrated in FIGS. 3D to 3F, may be configured by two separate component surfaces 7a and 7b connected with each other. In other words, the fourth side surface 7 may be configured by two component surfaces between the top surface and the bottom surface. In such a case, the peripheral cutting edge 14 when the corner B is used for cutting and the peripheral cutting edge 16 when the corner C is used for cutting have the upper flank 7a and the lower flank 7b, respectively. At this point, for example, as illustrated in FIG. 3D, the positive flank angle may be provided to the upper flank 7a, and the negative flank angle may be provided to the lower flank 7b. Further, for example, as illustrated in FIG. 3E, the negative flank angle may be provided to the upper flank 7a and the positive flank angle may be provided to the lower flank 7b. Furthermore, for example, as illustrated in FIG. 3F, the negative flank angle may be provided to both of the upper flank 7a and the lower flank 7b. Moreover, as illustrated in FIG. 3G, the fourth side surface 7 may be configured by three separate component surfaces 7a, 7b, and 7c connected with one another at two positions in a vertical direction between the top and bottom surfaces 2, 3, respectively.

The cutting insert 1 according to the present exemplary embodiment is formed of a hard material such as cemented carbide, coated cemented carbide, cermet, ceramic, or diamond, or ultra-high pressure sintered compact containing cubic boron nitride.

The endmill 41 of a three-cutting-edge type attached with the above-described cutting insert 1 will be described hereinbelow.

Figure 4A:
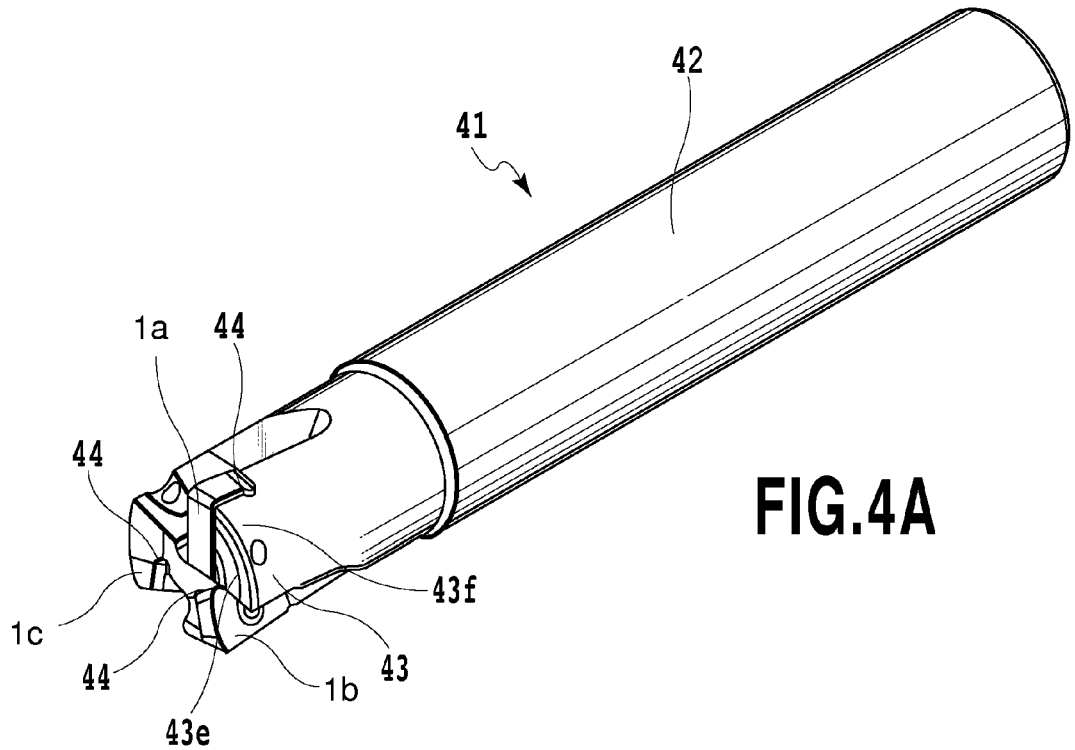
FIG. 4A is a perspective view of an endmill attached with the cutting insert illustrated in FIGS. 1A to 1D.
Figure 4B:
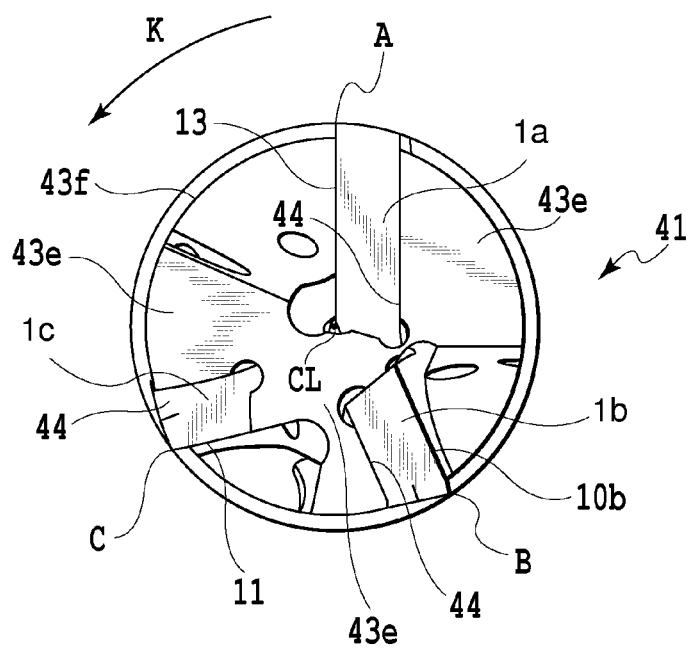
FIG. 4B is a front view of the endmill attached with the cutting insert illustrated in FIGS. 1A to 1D.

FIGS. 4A and 4B illustrate the endmill 41 of a three-cutting-edge type attached with the above-described cutting insert 1 (1a, 1b, 1c). At a tip end portion 43 of a cylindrical tool body 42, three seat portions 44 are provided to which the cutting inserts 1a, 1b, 1c are removably attached, and an abutment surface on which the top surface 2 or the bottom surface 3 of the cutting insert 1 (1a, 1b, 1c) on each seat portion 44 is seated is oriented in a rotation direction K of the tool body 42. On each seat portion 44, the cutting insert 1 (1a, 1b, 1c) according to the exemplary embodiment described above is attached.

The first cutting insert 1a, of the three cutting inserts 1 (1a, 1b, 1c), is disposed such that the upper first corner A, the face cutting edge 13, and the peripheral cutting edge 10a are involved in cutting. In other words, the upper first corner A and the peripheral cutting edge 10a are disposed to slightly protrude outside from a peripheral surface of the tip end portion 43 of the tool body 42, further the face cutting edge 13 is disposed to slightly protrude forward from the tip end surface 43e of the tool body 42, and furthermore the face cutting edge 13 is disposed to extend from the peripheral surface 43f of the tip end portion 43 of the tool body 42 to an axis of rotation CL of the tool body 42.

The second cutting insert 1b, of the three cutting inserts 1 (1a, 1b, 1c), is disposed such that the upper second corner B, the face cutting edge 10b, and the peripheral cutting edge 14 are each involved in cutting. In other words, the upper second corner B and the peripheral cutting edge 14 are disposed to slightly protrude outward from the peripheral surface 43f of the tool body 42, and further the face cutting edge 10b is disposed to slightly protrude forward from the tip end surface 43e of the tool body 42. Further, the second cutting insert 1b is disposed at a position where the second cutting insert 1b does not intersect the axis of rotation CL of the tool body 42 when viewed from the tip end side of the tool.

The third cutting insert 1c, of the three cutting inserts 1 (1a, 1b, 1c), is disposed such that the lower third corner C, the face cutting edge 11, and the peripheral cutting edge 16 are involved in cutting. In other words, the third cutting insert 1c is disposed such that the lower third corner C and the peripheral cutting edge 16 slightly protrude outward from the peripheral surface 43f of the tool body 42, and also the face cutting edge 11 slightly protrudes forward from the tip end surface 43e of the tool body 42. Further, the cutting insert 1c is disposed at a position where the cutting insert 1c does not intersect the axis of rotation CL of the tool body 42 when viewed from the tip end side of the tool.

Each cutting insert 1 (1a, 1b, 1c) is provided such that rotational trajectories of the corners A, B, and C are superimposed with one another when the endmill is rotated. Thus, three effective cutting edges (cutting edge involved in cutting) are provided on a side of a tool periphery of the endmill 41. The three cutting inserts 1 (1a, 1b, 1c) may be disposed at positions equally dividing a peripheral circle of the tool body 42 into three when viewed from the tip end side of the tool, or at positions with irregular interval on the peripheral circle of the tool body 42. Further, the three cutting inserts 1 (1a, 1b, 1c) are attached to the tool body 42 to provide the positive flank angle to axial rakes of all the face cutting edges.

Operations and effects of the endmill of a three-cutting-edge type attached with the three cutting inserts 1 (1a, 1b, 1c) described above will be described hereinbelow.

In the above-described endmill 41, the tool body 42 is rotated in the tool rotation direction K about the axis of rotation CL and fed in the XY direction and the Z direction, and thereby the work material can be cut in the lateral direction and the depth direction. When a cutting work is performed, each peripheral cutting edge of the three cutting inserts 1 (1a, 1b, 1c) performs cutting in the lateral direction of the work material, and each face cutting edge performs cutting in the depth direction. Since the face cutting edge 13 of the cutting insert 1a using the corner A extends from the peripheral surface 43f of the tool body 42 to the axis of rotation CL, the drilling can be performed. In other words, the face cutting edge 13 extends in a radial direction about the axis of rotation CL. The first to third cutting inserts 1 (1a, 1b, 1c) are provided to the tool body 42 such that, when the endmill 41 is rotated, the rotational trajectories of the corners A, B, and C are superimposed with one another, and also the rotational trajectories of the three peripheral cutting edges are superimposed with one another. Therefore, the endmill 41 includes three cutting edges that effectively function when cross-feed machining is performed. As a result, when the cutting work is performed at feeding of one cutting edge equivalent to that of the prior-art endmill, the endmill 41 according to the present exemplary embodiment can perform the cutting work at a relatively higher table feeding than that of the prior-art endmill, thereby realizing high-efficiency machining. Further, when the cutting work is performed at the same table feeding as that of the prior-art endmill, a feed rate per one cutting edge for the endmill 41 according to the present exemplary embodiment is relatively small, thus enabling stable machining.

All of the three cutting inserts 1 (1a, 1b, 1c) attached to the endmill 41 according to the present exemplary embodiment are of the same type, and the respective different corners of the three cutting inserts 1 (1a, 1b, 1c) are used for the cutting work. Therefore, when the cutting edge is damaged or abraded, the attachment position where the cutting insert 1 (1a, 1b, 1c) is attached on each of the three seat portions 44 is changed to another seat portion 44, and the corner used for each cutting insert 1 (1a, 1b, 1c) is changed according to the change of the attachment position. Since the side surface 5 on the side of the second short side is configured by two of the first and second component surfaces 5a and 5b, in the cutting insert 1a performing the cutting work using the upper first corner A, the upper second corner B that is not involved in cutting is flanked, and thus, the upper second corner B of the cutting insert 1a is not abraded. Further, in the cutting insert 1b performing the cutting work using the upper second corner B, the upper first corner A that is not involved in cutting is flanked, and thus the upper first corner A of the cutting insert 1b is not abraded. Therefore, according to the present exemplary embodiment, in one cutting insert 1, of the upper first corner A and the upper second corner B that are adjacent to each other, while one corner is being used, the other corner can be kept in a preferable state free from damage and abrasion.

In other words, when the cutting insert for the prior-art endmill of a two-cutting-edge type is forcibly applied to the endmill of a three-cutting-edge type, if the corner A is used, then the corner B is also abraded, and if the corner B is used, then the corner A is also abraded. Thus, it is impossible, in the prior-art endmill of a two-cutting-edge type, to apply the same cutting insert to all three cutting edges.

According to the present invention, with the above-described configuration, the same cutting inserts 1 can be applied to the tool body 42 with the all three cutting edges kept in a preferable state. With this arrangement, according to the present exemplary embodiment, without wasting any one of the corners involved in cutting by the cutting insert 1, the cutting work can be performed with a plurality (three) of cutting inserts 1 of a single type. Therefore, since the cutting inserts of a plurality of types do not need to be manufactured and the corners involved in cutting are not wasted, machining costs can be reduced. Further, since only the cutting inserts 1 of a singly type are used, stock management of the tools can be also facilitated.

It is preferable that the connection portion α between the first and second component surfaces 5a and 5b on the side surface 5 be located closer to a side of the upper second corner B. Since the closer to the side of the upper second corner B, the connection portion α is located, the longer the cutting edge 10a becomes, the maximum depth of the cutting of the tool becomes larger, and the amount of cutting for one cutting can be larger, accordingly. If the maximum cutting depth is too small, the amount of cutting for one cutting cannot be very large, and thus machining efficiency is reduced. The purpose of the endmill of a three-cutting-edge type is to improve the machining efficiency, and locating the connection portion α closer to the upper second corner B can further increase the machining efficiency.

All the face cutting edges 13, 10b, and 11 of the respective corners A, B, and C include the positive flank angles, and when the three cutting inserts 1 are attached to the tool body 42 of the endmill 41, the axial rake can be positive. Thus, when the Z-direction feed machining (drilling) is performed, chips can be preferably discharged. Therefore, damage to the cutting edge caused by biting of the chips can be reduced. Further, since cutting sharpness of the face cutting edge can be also improved, the machining efficiency can be improved accordingly. When the drilling is performed, since discharging the chips causes big problems due to its machining nature, it is advantageous that all the face cutting edges have the positive flank angles.

Further, since the corners A, B, and C involved in cutting are formed to have the tool angle of 90° or less, in other words, the face cutting edge and the peripheral cutting edge are formed to intersect each other at an angle of 90° or less, the machining in the lateral direction of the work material and the machining in the depth direction thereof by one type of cutting insert 1 can be performed with high efficiency.

Further, when the side surface 6 on the side of the first long side is configured by two component surfaces 6a and 6b, if the cutting work is performed using the upper first corner A, since the cutting edge 13b is flanked, cutting resistance can be reduced. Similarly, when the side surface 4 on the side of the first short side is configured by two component surfaces 4a and 4b, if the cutting work is performed using the lower third corner C, the cutting edge 11a is flanked, and thus the cutting resistance can be further reduced. Accordingly, the machining efficiency is improved. In other words, the cutting edge 13a and the cutting edge 11b function as a flat drag. The longer the cutting edge is, the larger the cutting resistance becomes, but, adopting the above-described configuration can make optimum the lengths of the cutting edge 13a and the cutting edge 11b functioning as the flat drag, and can reduce the cutting resistance.

Further, as illustrated in FIGS. 3B to 3E, when the positive or negative flank angle is provided to the side surface 7 in contact with the second long side of the cutting insert 1 from the top surface 2 to the bottom surface 3, either of the flank of the peripheral cutting edge 14 or the flank of the peripheral cutting edge 16 always includes the positive flank angle. Thus, when the cutting sharpness is emphasized, the embodiments described above are preferable. As illustrated in FIGS. 3F and 3G, when the flanks of the peripheral cutting edge 14 and the peripheral cutting edge 16 are the same and have the angle of 90° or have the negative flank angles, since both the peripheral cutting edges have the negative flank angles and thus, when a strength of the cutting edge is emphasized, those embodiments are preferable. Selection of those exemplary embodiments is appropriately determined based on the type of the work material to be cut and a target shape thereof.

With reference to FIGS. 5A to 5C and FIG. 6, the cutting insert 51, which is another exemplary embodiment of the present invention, will be described. In the cutting insert 51 according to the present exemplary embodiment, component parts similar to the above-described cutting insert 1 will not be repeatedly described, and the same reference numerals will be used.

Figure 5C:
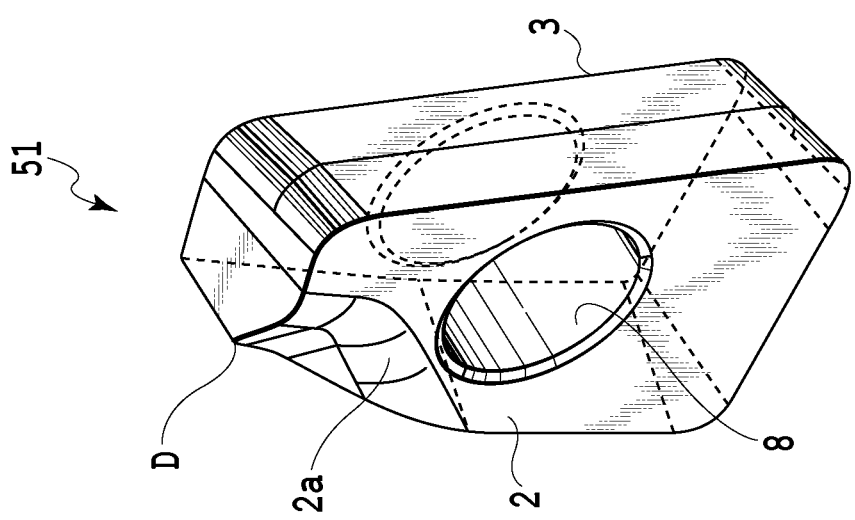
FIG. 5C is a perspective view of the cutting insert illustrated in FIG. 5A.
Figure 5B:
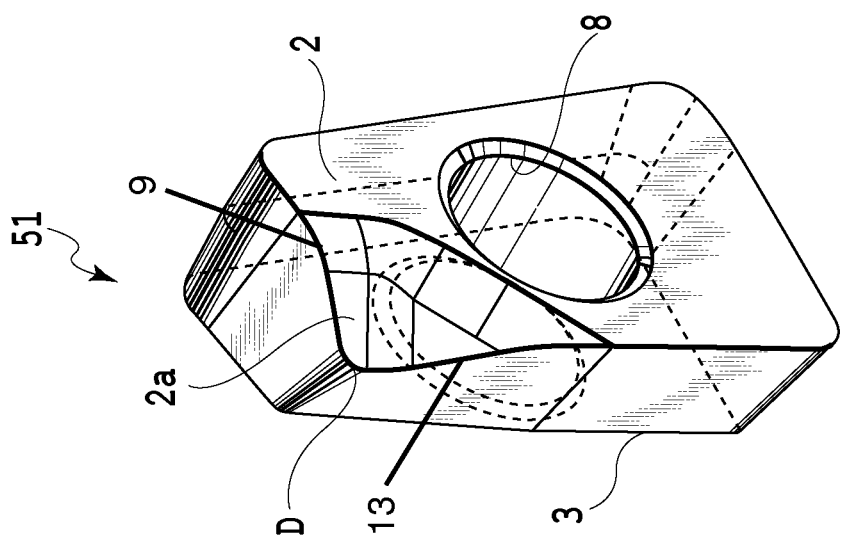
FIG. 5B is a perspective view of the cutting insert illustrated in FIG. 5A.
Figure 5A:
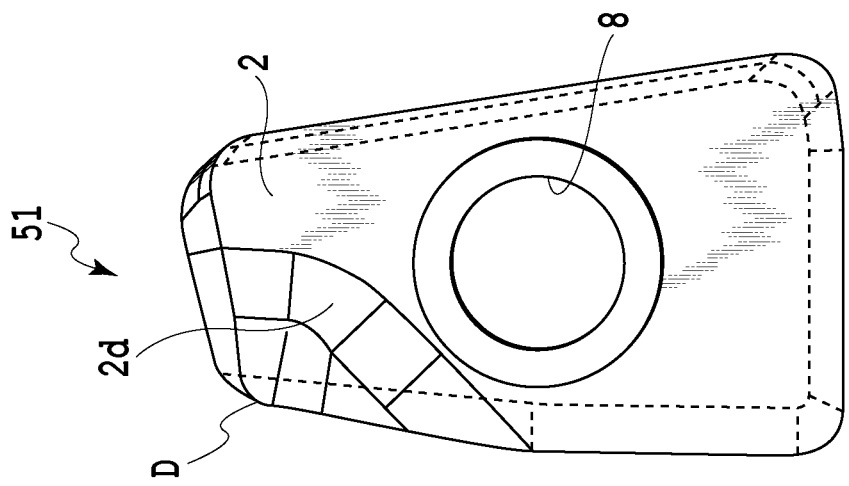
FIG. 5A is a top surface view of another exemplary embodiment of the cutting insert of the present invention.

As illustrated in FIGS. 5A to 5C, the cutting insert 51 according to the present exemplary embodiment is configured by modifying a shape near a corner (defined as a corner D) formed by intersecting of the upper first long side 13 and the upper first short side 9 of the cutting insert described above. The corner D is not the cutting edge but a portion located on the axis of rotation of the tool body 42 when the cutting insert 51 is attached to the tool body 42 to use the upper first corner A for cutting. According to the present exemplary embodiment, when the cutting insert is viewed in a plan view, the top surface 2 near the corner D is inclined to gradually reduce a thickness from a side of a mounting hole 8 to a side of the corner D in a direction of the bottom surface 3. This inclining portion 2a may be configured by a curve surface or a flat surface. Further, the depth of the inclining portion 2a between the top surface 2 and the bottom surface 3 is appropriately determined within a range where the strength of the cutting insert 51 near the corner D can be maintained.

Figure 6:
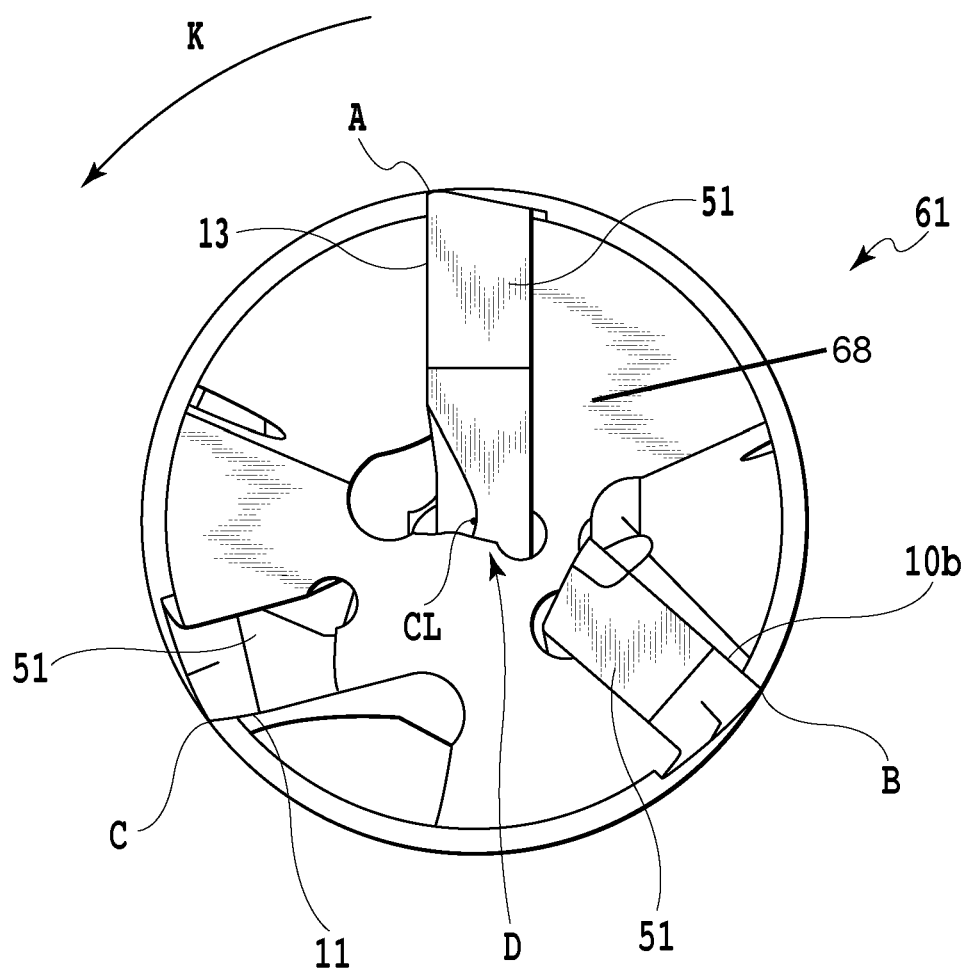
FIG. 6 is a front view of the endmill attached with the cutting insert illustrated in FIGS. 5A to 5C.

FIG. 6 illustrates an endmill 61 where the above-described cutting insert 51 is attached to the tool body 42. As illustrated in this diagram, a straight line passing a straight line portion of the face cutting edge 13 of the cutting insert 51 is offset from the axis of rotation CL to a side of the rotation direction K of the tool body 42. A vicinity of an end portion on a side of the axis of rotation CL of the face cutting edge 13 is a flank portion that recesses in an opposite direction of the rotation direction K of the tool body 42 with respect to a straight line portion of the face cutting edge 13, in other words, in a direction of getting closer to the axis of rotation CL. With this configuration, the thickness of back metal of the endmill 61 can be made larger. The cutting insert 1 illustrated in FIGS. 4A and 4B is disposed such that the corner D is not offset forward in the tool rotation direction K from the axis of rotation CL with respect to the tool body 42 (in other words, the cutting insert 1 is disposed to, so called, below the center with respect to the tool body 42). Otherwise, in the drilling, the cutting work cannot be performed in a region near the axis of rotation CL of the work material. On the other hand, since the above-described flank portion is provided near the corner D in the cutting insert 51 according to the present exemplary embodiment, the cutting insert 51 does not need to be disposed by being shifted backward in the tool rotation direction K, and thus the cutting insert 51 can be disposed on the axis of rotation CL. Therefore, a tool region 68 can be made large backward in the tool rotation direction K of the disposed cutting insert 51. Since the endmill of a three-cutting-edge type needs to attach three cutting edge inserts, the thickness of the back metal per cutting insert is reduced compared with that of a two-cutting-edge type. The cutting insert 51 is shaped as described above, and thus the thickness of the back metal can be made larger. Therefore, elastic deformation or plastic deformation of the back metal can be suppressed and further a space for a screw for fixing the cutting insert 51 can be made longer, and thus, in the endmill of a three-cutting-edge type, the damage of the back metal and instability of the cutting insert can be effectively suppressed.

Further, various modifications performed on the above-described cutting insert 1 can be similarly applied to the cutting insert 51 according to the present exemplary embodiment.

Figure 7A:
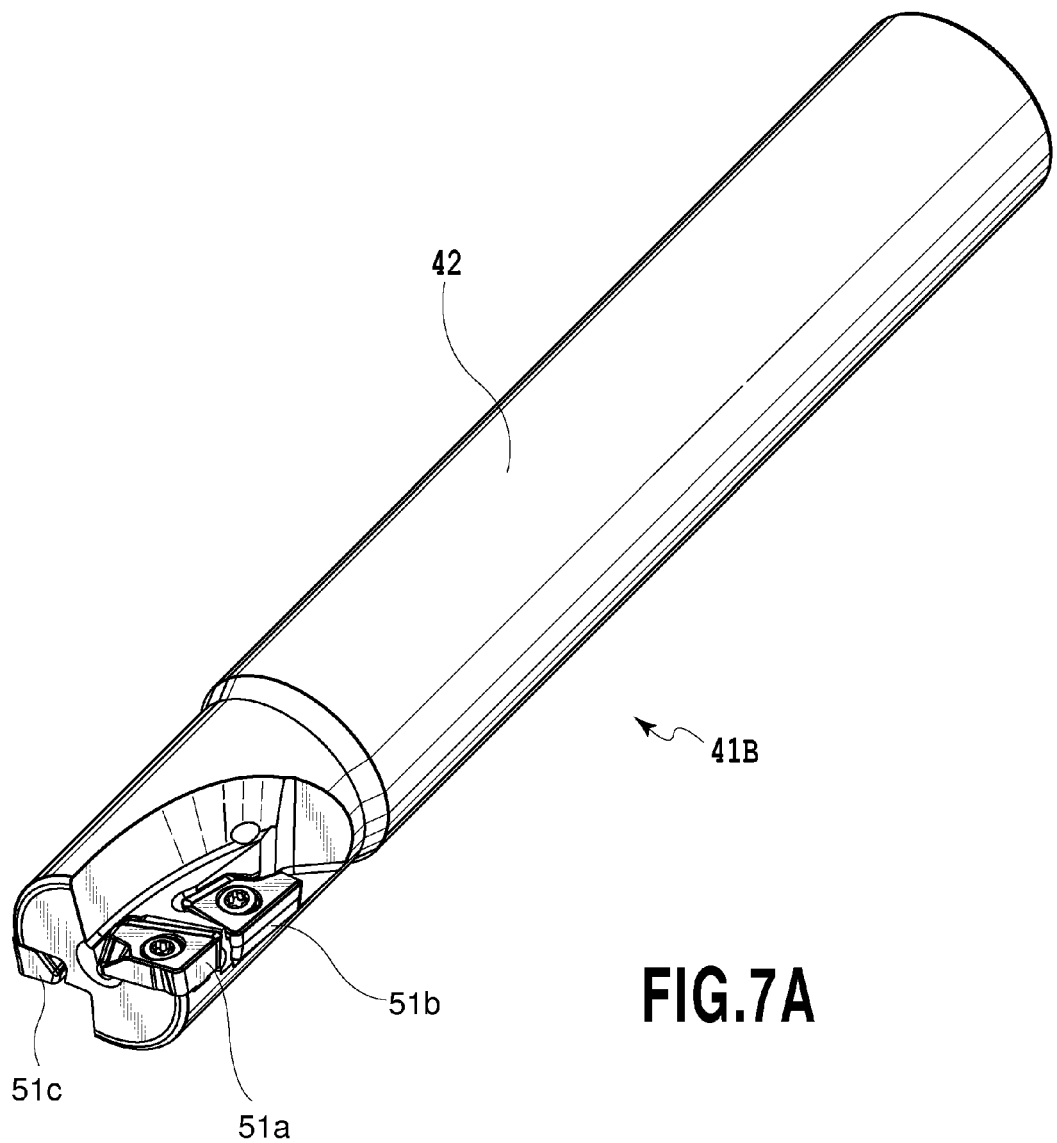
FIG. 7A is a perspective view of another endmill attached with the cutting insert illustrated in FIG. 5A.
Figure 7B:
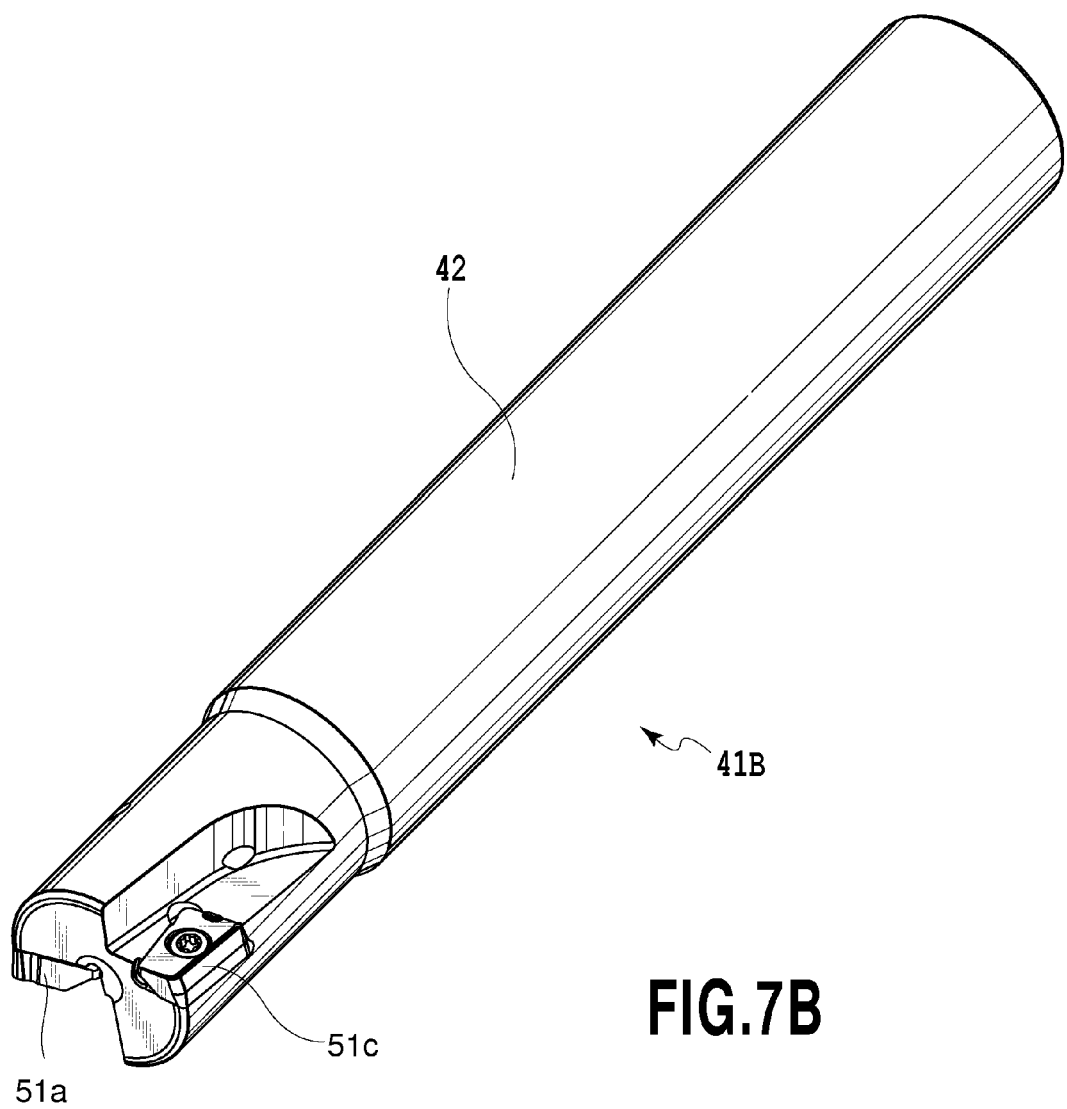
FIG. 7B is a perspective view in another direction of the endmill illustrated in FIG. 7A
Figure 7C:
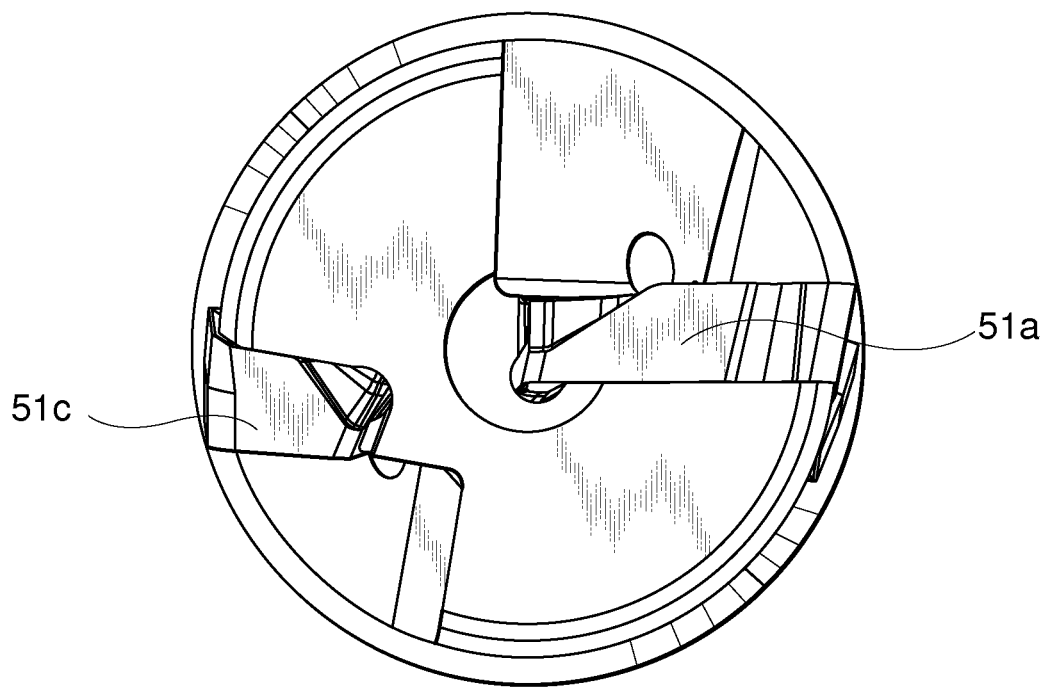
FIG. 7C is a front view of the endmill illustrated in FIG. 7A.

FIGS. 7A to 7C illustrate the endmill according to another exemplary embodiment attached with the cutting insert 51 (51A, 51B, 1C) illustrated in FIG. 5A. An endmill 41B illustrated in FIGS. 7A to 7C is, so called, the endmill of a two-cutting-edge type. As described above, the cutting insert according to the present invention can be used for the endmill of a two-cutting-edge type. The cutting edge involved in cutting is similar to a case of the endmill according to the exemplary embodiment illustrated in FIG. 4A and 4B and FIGS. 5A to 5C. As illustrated in the figures, by using the three inserts of a two-cutting-edge type, deep cutting can be performed, and as a result, the high-efficiency machining can be performed. Since one type of cutting insert can be used in turn, three inserts can be used without waste.

As described above, the typical exemplary embodiments of the present invention have been described, but, various modifications can be applied to the present invention, and replacement and change can be made without departing from the spirit and the scope of the present invention defined by the scope of claims of the present application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A cutting insert in a plate-like shape comprising:
   a top surface and a bottom surface having a substantially polygonal outer shape;
   at least four side surfaces extending between the top surface and the bottom surface; and
   a mounting hole passing through the top surface and the bottom surface,
   wherein, of at least four sides of the top surface corresponding to the at least four side surfaces, upper first and upper second short sides are formed to be non-parallel to each other and different in length from each other, and upper first and upper second long sides are formed to be non-parallel to each other and different in length from each other;
   wherein, of the at least four side surfaces, a first side surface corresponding to the upper first short side comprises a positive flank angle from the bottom surface toward the top surface;
   wherein, of the at least four side surfaces, a second side surface corresponding to the upper second short side comprises a positive flank angle from the top surface toward the bottom surface;
   wherein, of the at least four side surfaces, a third side surface corresponding to the upper first long side comprises a positive flank angle from the top surface toward the bottom surface; and
   wherein the second side surface includes a first and a second component surface connected with each other such that the side surface protrudes outwardly from a peripheral surface of the cutting insert, and a connection portion between the first and second component surfaces of the second side surface extends between the top surface and the bottom surface.

2. The cutting insert according to claim 1, wherein, in a side surface view of the second side surface, the connection portion is formed between the two upper long sides at a position closer to the upper second long side.

3. The cutting insert according to claim 1, wherein, at a corner portion where the upper first long side and the upper first short side intersect each other, the top surface comprises an inclined surface portion that gradually inclines from the top surface toward the bottom surface from a side of the mounting hole toward a side of a tip end of the corner portion.

4. The cutting insert according to claim 1,
   wherein an angle of a first insert corner where the upper second short side and the upper first long side intersect each other is 90° or less;
   wherein an angle of a second insert corner where the upper second short side and the upper second long side intersect each other is 90° or less; and
   wherein an angle of a third insert corner where a lower first short side and a lower second long side of the bottom surface corresponding respectively to the upper first short side and the upper second long side of the top surface is 90° or less.

5. The cutting insert according to claim 1, wherein the third side surface has a first and a second component surface, both extending in a direction along the top surface and the bottom surface so as to protrude outwardly from the cutting insert.

6. The cutting insert according to claim 1, wherein the first side surface comprises a first and a second component surface that are connected with each other so that the first side surface protrudes outwardly from the peripheral surface of the cutting insert, and a connection portion between the first and second component surfaces of the first side surface extends between the top surface and the bottom surface.

7. The cutting insert according to claim 1, wherein a fourth side surface corresponding to the upper second long side has a first and a second component surface that are connected with each other so that the fourth side surface protrudes outwardly from the peripheral surface of the cutting insert, and a connection portion between the first and second component surfaces of the fourth side surface extends in a direction along the top surface and the bottom surface at a position away from the top surface and the bottom surface.

8. The cutting insert according to claim 1, wherein a fourth side surface corresponding to the upper second long side has a first, a second and a third component surface that are connected with one another so that the fourth side surface protrudes outwardly from the peripheral surface of the cutting insert, and a connection portion between the first component surface and the second component surface of the fourth side surface, and a connection portion between the second component surface and the third component surface of the fourth side surface both extend in a direction along the top surface and the bottom surface at a position away from the top surface and the bottom surface, respectively.

9. An endmill comprising:
a cylindrical tool body having a peripheral surface and a tip end portion;
three seat portions provided at the tip end portion of the tool body; and
a cutting insert according to claim 1 attached to each of the three seat portions.

10. The endmill according to claim 9, wherein:
in a first seat portion, the cutting insert is disposed such that a first insert corner involved in cutting is positioned on a tip end side and on a peripheral surface side of the tool body,
in a second seat portion, the cutting insert is disposed such that a second insert corner involved in cutting is positioned on a tip end side and on a peripheral surface side of the tool body,
in a third seat portion, the cutting insert is disposed such that a third insert corner involved in cutting is positioned on a tip end side and on a peripheral surface side of the tool body;
the three cutting inserts are disposed such that a face cutting edge of each cutting insert protrudes forward from the tip end surface of the tool body and a peripheral cutting edge of each cutting insert protrudes outward from the peripheral surface of the tool body; and
the first, second and third insert corners differ from one another.

11. The cutting insert according to claim 1, further comprising:
a first insert corner formed at an intersection of the upper second short side and the upper first long side;
a first cutting edge associated with the first insert corner, the first cutting edge comprising a cutting edge portion extending along the upper second short side and a cutting edge portion extending along the upper first long side, the first cutting edge having an associated first rake surface on the top surface;
a second insert corner formed at an intersection of the upper second short side and the upper second long side;
a second cutting edge associated with the second insert corner, the second cutting edge comprising a cutting edge portion extending along the upper second short side and a cutting edge portion extending along the upper second long side, the second cutting edge having an associated second rake surface on the top surface;
a third insert corner formed at an intersection of a lower first short side and a lower second long side, the lower first short side and the lower second long side belonging to the bottom surface and corresponding respectively to the upper first short side and the upper second long side of the top surface; and
a third cutting edge associated with the third insert corner, the third cutting edge comprising a cutting edge portion extending along the lower first short side and a cutting edge portion extending along the lower second long side, the third cutting edge having as associated third rake surface on the bottom surface.

12. The cutting insert according to claim 11,
wherein an angle of the first insert corner where the upper second short side and the upper first long side intersect each other is 90° or less;
wherein an angle of the second insert corner where the upper second short side and the upper second long side intersect each other is 90° or less; and
wherein an angle of the third insert corner where a lower first short side and a lower second long side of the bottom surface corresponding respectively to the upper first short side and the upper second long side of the top surface is 90° or less.

13. The cutting insert according to claim 11, wherein:
in the first cutting edge, the cutting edge portion extending along the upper second short side is configured to serve as a main cutting edge and the cutting edge portion extending along the upper first long side is configured to serve as a sub cutting edge;
in the second cutting edge, the cutting edge portion extending along the upper second short side is configured to serve as a sub cutting edge and the cutting edge portion extending along the upper second long side is configured to serve as a main cutting edge; and
in the third cutting edge, the cutting edge portion extending along the lower first short side is configured to serve as a sub cutting edge and the cutting edge portion extending along the lower second long side is configured to serve as a main cutting edge.

14. A cutting insert in a plate-like shape comprising:
a top surface and a bottom surface having a substantially polygonal outer shape;
at least four side surfaces extending between the top surface and the bottom surface; and
a mounting hole passing through the top surface and the bottom surface,
wherein, of at least four sides of the top surface corresponding to the at least four side surfaces, upper first and upper second short sides are formed to be non-parallel to each other and different in length from each other, and upper first and upper second long sides are formed to be non-parallel to each other and different in length from each other;
wherein the cutting insert comprises a first cutting edge, a second cutting edge and a third cutting edge; the first cutting edge comprises a cutting edge portion extending along the upper second short side and a cutting edge portion extending along the upper first long side, the second cutting edge comprises a cutting edge portion extending along the upper second short side and a cutting edge portion extending along the upper second long side, and the third cutting edge comprises a cutting edge portion extending along a lower first short side and a cutting edge portion extending along a lower second long side, the lower first short side and the lower second long side of the bottom surface corresponding respectively to the upper first short side and the upper second long side of the top surface;

wherein when a first insert corner of the first cutting edge where the upper second short side and the upper first long side intersect each other is involved in cutting, the top surface becomes a rake surface;

wherein when a second insert corner of the second cutting edge where the upper second short side and the upper second long side intersect each other is involved in cutting, the top surface becomes a rake surface;

wherein when a third insert corner of the third cutting edge where the lower first short side and the lower second long side intersect each other is involved in cutting, the bottom surface becomes a rake surface;

wherein, of the at least four side surfaces, a first side surface corresponding to the upper first short side serves as a flank when the third insert corner is involved in cutting and comprises a positive flank angle from the bottom surface toward the top surface;

wherein, of the at least four side surfaces, a second side surface corresponding to the upper second short side serves as a flank when one of the first and second insert corners is involved in cutting and comprises a positive flank angle from the top surface toward the bottom surface;

wherein, of the at least four side surfaces, a third side surface corresponding to the upper first long side serves as a flank when the first insert corner is involved in cutting and comprises a positive flank angle from the top surface toward the bottom surface; and wherein the second side surface includes a first and a second component surface connected with each other such that the side surface protrudes outwardly from a peripheral surface of the cutting insert, and a connection portion between the first and second component surfaces of the second side surface extends between the top surface and the bottom surface.

15. The cutting insert according to claim 14, wherein, in a side surface view of the second side surface, the connection portion is formed between the two upper long sides at a position closer to the upper second long side.

16. The cutting insert according to claim 14, wherein, at a corner portion where the upper first long side and the upper first short side intersect each other, the top surface comprises an inclined surface portion that gradually inclines from the top surface toward the bottom surface from a side of the mounting hole toward a side of a tip end of the corner portion.

17. The cutting insert according to claim 14,
wherein an angle of the first insert corner where the upper second short side and the upper first long side intersect each other is 90° or less;
wherein an angle of the second insert corner where the upper second short side and the upper second long side intersect each other is 90° or less; and
wherein an angle of the third insert corner where a lower first short side and a lower second long side of the bottom surface corresponding respectively to the upper first short side and the upper second long side of the top surface is 90° or less.

18. The cutting insert according to claim 14, wherein:
in the first cutting edge, the cutting edge portion extending along the upper second short side is configured to serve as a main cutting edge and the cutting edge portion extending along the upper first long side is configured to serve as a sub cutting edge;
in the second cutting edge, the cutting edge portion extending along the upper second short side is configured to serve as a sub cutting edge and the cutting edge portion extending along the upper second long side is configured to serve as a main cutting edge; and
in the third cutting edge, the cutting edge portion extending along the lower first short side is configured to serve as a sub cutting edge and the cutting edge portion extending along the lower second long side is configured to serve as a main cutting edge.

19. An endmill comprising:
a cylindrical tool body having a peripheral surface and a tip end portion;
three seat portions provided at the tip end portion of the tool body; and
a cutting insert according to claim 14 attached to each of the three seat portions.

20. The endmill according to claim 19, wherein:
in a first seat portion, the cutting insert is disposed such that a first insert corner involved in cutting is positioned on a tip end side and on a peripheral surface side of the tool body,
in a second seat portion, the cutting insert is disposed such that a second insert corner involved in cutting is positioned on a tip end side and on a peripheral surface side of the tool body,
in a third seat portion, the cutting insert is disposed such that a third insert corner involved in cutting is positioned on a tip end side and on a peripheral surface side of the tool body;
the three cutting inserts are disposed such that a face cutting edge of each cutting insert protrudes forward from the tip end surface of the tool body and a peripheral cutting edge of each cutting insert protrudes outward from the peripheral surface of the tool body; and
the first, second and third insert corners differ from one another.

* * * * *